United States Patent
Zhu et al.

(10) Patent No.: US 12,449,089 B2
(45) Date of Patent: Oct. 21, 2025

(54) ONE-STEP LOCKING STAND

(71) Applicant: ZHONGSHAN DASHAN PHOTOGRAPHIC EQUIPMENT CO., LTD., Guangdong (CN)

(72) Inventors: Xihua Zhu, Guangdong (CN); Jinhua Duan, Guangdong (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 0 days.

(21) Appl. No.: 18/786,556

(22) Filed: Jul. 28, 2024

(65) Prior Publication Data
US 2025/0305625 A1  Oct. 2, 2025

(30) Foreign Application Priority Data
Mar. 27, 2024 (CN) .......................... 202410361687.5

(51) Int. Cl.
*F16M 11/32* (2006.01)
(52) U.S. Cl.
CPC ....... *F16M 11/32* (2013.01); *F16M 2200/025* (2013.01)
(58) Field of Classification Search
CPC ............. F16M 11/32; F16M 2200/025; F16M 2200/027; F16M 11/26; F16M 11/24;
(Continued)

(56) References Cited

U.S. PATENT DOCUMENTS 1,495,458 A * 5/1924 Thalhammer .......... F16M 11/34
248/188.5
5,320,316 A * 6/1994 Baker .................... F16M 11/36
248/163.1
(Continued)

FOREIGN PATENT DOCUMENTS

CN  112856168 A  5/2021
CN  115388300 A  11/2022
(Continued)

OTHER PUBLICATIONS

Machine translation of Lian CN 112856168.*
(Continued)

*Primary Examiner* — Christopher Garft

(57) ABSTRACT

A one-step locking stand includes a fixing portion and at least one supporting leg connected to the fixing portion. The supporting leg includes first, second, and third sections axially connected to one another; an operating assembly arranged at one of the sections; a first transmission assembly connected to the operating assembly; a first locking assembly fixedly arranged at the second section, slidably connected to the first section, and connected to the first transmission assembly; a second transmission assembly connected to the first locking assembly and slidable through an interior cavity of the second section; and a second locking assembly arranged at the first section and connected to the second transmission assembly; wherein when the first locking assembly is driven to move axially to lock or release the first section, the first locking assembly is driven to move the second locking assembly axially to lock or release the third section.

18 Claims, 10 Drawing Sheets

(58) Field of Classification Search
CPC ........ F16B 7/1454; F16B 7/14; F16B 7/1409; F16B 7/1418; F16B 7/1427
USPC ...................................................... 248/188.5
See application file for complete search history.

(56) References Cited

U.S. PATENT DOCUMENTS

| | | | | |
|---|---|---|---|---|
| 5,351,922 | A * | 10/1994 | Lindsay | F16M 11/32 192/109 R |
| 5,887,835 | A * | 3/1999 | Hein | F16M 11/26 248/161 |
| 6,082,685 | A * | 7/2000 | Hein | F16M 11/26 248/161 |
| 6,286,795 | B1 * | 9/2001 | Johnson | F16M 11/16 248/188 |
| 6,688,566 | B1 * | 2/2004 | Crain | G01C 15/00 248/168 |
| 6,702,482 | B2 * | 3/2004 | Sherwin | G03B 17/561 396/428 |
| 7,654,494 | B2 * | 2/2010 | Cartoni | G03B 17/561 248/163.1 |
| 2003/0189145 | A1 * | 10/2003 | Lindsay | F16M 11/34 248/226.11 |
| 2004/0051010 | A1 * | 3/2004 | Blackburn | F16M 11/32 248/161 |
| 2010/0064739 | A1 * | 3/2010 | Lu | F16M 11/34 70/57 |
| 2010/0282921 | A1 * | 11/2010 | Hein | G03B 17/561 248/125.8 |
| 2011/0031358 | A1 * | 2/2011 | Fischer | F16M 11/36 248/168 |
| 2016/0298805 | A1 * | 10/2016 | Guest | F16M 11/32 |
| 2018/0252354 | A1 * | 9/2018 | Brady | F16B 2/185 |
| 2020/0140067 | A1 * | 5/2020 | Mo | B64C 25/26 |
| 2021/0010637 | A1 * | 1/2021 | He | F16M 11/16 |
| 2021/0396349 | A1 * | 12/2021 | Speggiorin | F16M 11/36 |
| 2022/0291574 | A1 * | 9/2022 | Speggiorin | F16B 7/1454 |
| 2024/0377019 | A1 * | 11/2024 | Liang | F16M 11/14 |

FOREIGN PATENT DOCUMENTS

| | | |
|---|---|---|
| CN | 217978230 | 12/2022 |
| CN | 218119304 U | 12/2022 |
| CN | 218178492 U | 12/2022 |
| CN | 117404580 A | 1/2024 |
| WO | 9920933 A1 | 4/1999 |
| WO | 2022206157 A1 | 10/2022 |

OTHER PUBLICATIONS

Office Action Dated Oct. 19, 2024 for Corresponding Chinese Patent Application No. 202410361687.5.
Extended European Search Report Dated Jan. 22, 2025 for Corresponding European Patent Application No. 24194955.1.
Office Action Dated Jan. 25, 2025 for Corresponding Chinese Patent Application No. 202410361687.5.

* cited by examiner

ONE-STEP LOCKING STAND

CROSS-REFERENCE TO RELATED APPLICATIONS

The present disclosure claims priority of Chinese Patent disclosure No. 202410361687.5, filed on Mar. 27, 2024, the entire contents of which are hereby incorporated by reference.

TECHNICAL FIELD

The present disclosure relates to the technical field of photographic equipment, and in particular to a one-step locking stand.

BACKGROUND

A photography stand is a commonly used device in the field of photography equipment, providing stable support for the camera. Existing photography stands often utilize joints to converge or expand a plurality of pipes connected end-to-end to reduce the volume and facilitate storage. However, the need to interlock or unlock each joint makes the operations of the stand cumbersome. A photography stand with transmission components has been developed to act on all the joints simultaneously, avoiding multiple operations and achieving quick locking and releasing of the stand. Nevertheless, these transmission components have complex structures, and high production costs, but low efficiency.

SUMMARY

An objective of the present disclosure is to provide a one-step locking stand that allows for quick and easy locking and releasing of the stand, addressing or mitigating the above technical problems to a certain extent.

The disclosure provides a one-step locking stand, including: a fixing portion and at least one supporting leg connected to the fixing portion, wherein the supporting leg includes: first, second and third sections connected one another along an axial direction, each section being movable axially relative to other sections to extend or shorten the supporting leg; an operating assembly arranged at one of the sections; a first transmission assembly connected to the operating assembly; a first locking assembly fixedly arranged at the second section, slidably connected to the first section, and connected to the first transmission assembly; a second transmission assembly connected to the first locking assembly, slidable through a lumen of the second section, and arranged spaced apart from the first transmission assembly; and a second locking assembly arranged at the third section and connected to the second transmission assembly; wherein when the operating assembly is operated, the first locking assembly is driven by the first transmission assembly to move axially, to lock or release the first section relative to the second section, and meanwhile, the second transmission assembly is driven by the first locking assembly to move axially, and the second locking assembly is driven by the second transmission assembly to lock or release the third section relative to the second section, so as to achieve one-step locking or releasing of all the sections of the supporting leg.

In some embodiments, the operating assembly is arranged at an end of the first section away from the second section.

In some embodiments, the first transmission assembly includes: a driving rod connected to the operating assembly and extending axially; a hollow screw mounted around one end of the driving rod away from the operating assembly and connected to the first locking assembly; and a fixing nut threadedly connected to an outer periphery of the hollow screw, wherein the operating assembly is configured to drive the driving rod to rotate axially, and when the driving rod rotates, the hollow screw moves axially under joint action of the driving rod and the fixing nut, driving the first locking assembly to move axially.

In some embodiments, the hollow screw and the driving rod are connected in a form-fit manner, wherein when the driving rod rotates, the hollow screw rotates together therewith.

In some embodiments, the first locking assembly includes a sliding seat respectively mounted around the first and second sections, as well as an adjusting member and a locking block movably arranged within the sliding seat; wherein the adjusting member is connected to the second transmission assembly and defines a through hole penetrating axially, a top end of the hollow screw passes through the through hole from bottom to top and is then connected to the fixing nut, the fixing nut is fixedly arranged within the sliding seat, a bottom end of the hollow screw supports a bottom end of the adjusting member, and the locking block is arranged between the adjusting member and the first section; wherein when the hollow screw moves axially, the adjusting member moves axially together therewith, thereby driving the locking block to move towards or away from the first section, and the adjusting member drives the second transmission assembly to move axially at the same time.

In some embodiments, the adjusting member includes an upper slider, an ejecting slider and a supporting slider deposed in axial order, the upper slider is configured to drive the locking block to move towards or away from the first section, the ejecting slider has an ejecting portion protruding out from the sliding seat, and the supporting slider is connected to the sliding seat through the ejecting portion, and wherein when the ejecting portion is operated, the ejecting slider drives the upper slider to move axially.

In some embodiments, the first section includes two first pipes respectively spaced apart on both sides of the driving rod, the second section includes two second pipes respectively spaced apart on both sides of the driving rod, each second pipe is movable axially between the driving rod and a corresponding first pipe, and the third section includes a third pipe movable to mount around the driving rod.

In some embodiments, the second section further includes a hollow central shaft extending axially, and the third pipe is movable to be inserted into a lumen of the central shaft.

In some embodiments, the adjusting member defines a perforation running axially therethrough, the second transmission assembly successively passes through a lumen of one second pipe, the perforation, and a lumen of another second pipe, and then connects to the second locking assembly.

In some embodiments, the second transmission assembly is a cable.

In some embodiments, the second locking assembly includes a locking ring and a locking piece, the locking piece is connected to one end of the second transmission assembly and defines a locking cavity, and the locking ring includes a surrounding segment mounted around the third pipe and two free segments respectively connected to both ends of the surrounding segment and received within the locking cavity, wherein when the second transmission assembly moves axially, the locking piece is driven to move axially together therewith, the locking cavity matches with the two free segments to bring them to move towards or away from each other, such that the surrounding segment locks or releases the third pipe.

In some embodiments, one side of the supporting slider is provided with a limiter defining a fixing hole, and the ejecting portion passes through the fixing hole and extends outside the sliding seat.

In some embodiments, the ejecting portion is an adjusting screw threaded to the ejecting slider.

In some embodiments, an extension direction of the ejecting portion is substantially perpendicular to the axial direction.

In some embodiments, a number of perforations is two, and the adjusting member is recessed with a groove for holding the second transmission assembly, with the two perforations respectively located at each end of the groove.

In some embodiments, a number of supporting legs is three.

In some embodiments, the operating assembly includes: a supporter, a pivot pin rotatably arranged on the supporter and matching with the driving rod, and a handle connected to the pivot pin, wherein when the handle is operated, the pivot pin is brought to rotate by the handle, and the driving rod is driven to rotate about a central axis thereof by the pivot pin.

In some embodiments, a first bevel gear is provided on an outer periphery of the pivot pin, a second bevel gear, which engages with the first bevel gear, is provided on an upper end of the driving rod, and the first bevel gear is arranged perpendicular to the second bevel gear.

In some embodiments, an outer periphery of the hollow screw is provided with an external thread, which is threaded to the fixing nut.

In some embodiments, an axial length of the external thread of the hollow screw is greater than an axial length of the fixing nut.

In embodiments of the one-step locking stand according to the present disclosure, the first and second locking assemblies are used to lock or release the first and second sections, respectively, and the first and second transmission assemblies are used to simultaneously transfer the action of the operating assembly to the first and second locking assemblies, respectively, thereby allowing all three sections of the stand to be locked or released in one step. In addition, the second transmission assembly can be conveniently placed within the second section, making the overall design simple and user-friendly.

Figure 1:
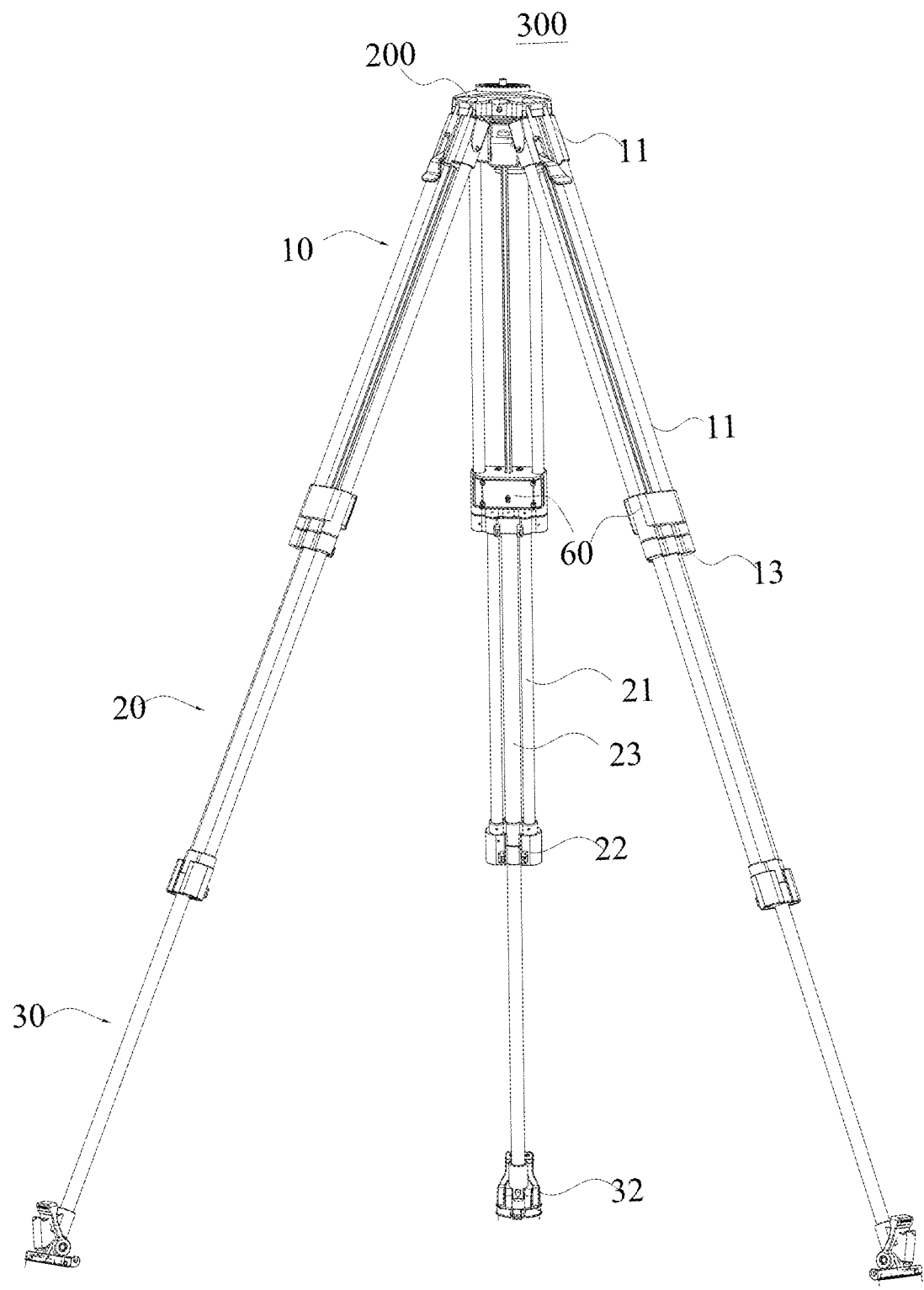
FIG. 1 shows a schematic structural view of a one-step locking stand in the unfolded state according to an embodiment of the present disclosure.
Figure 2:
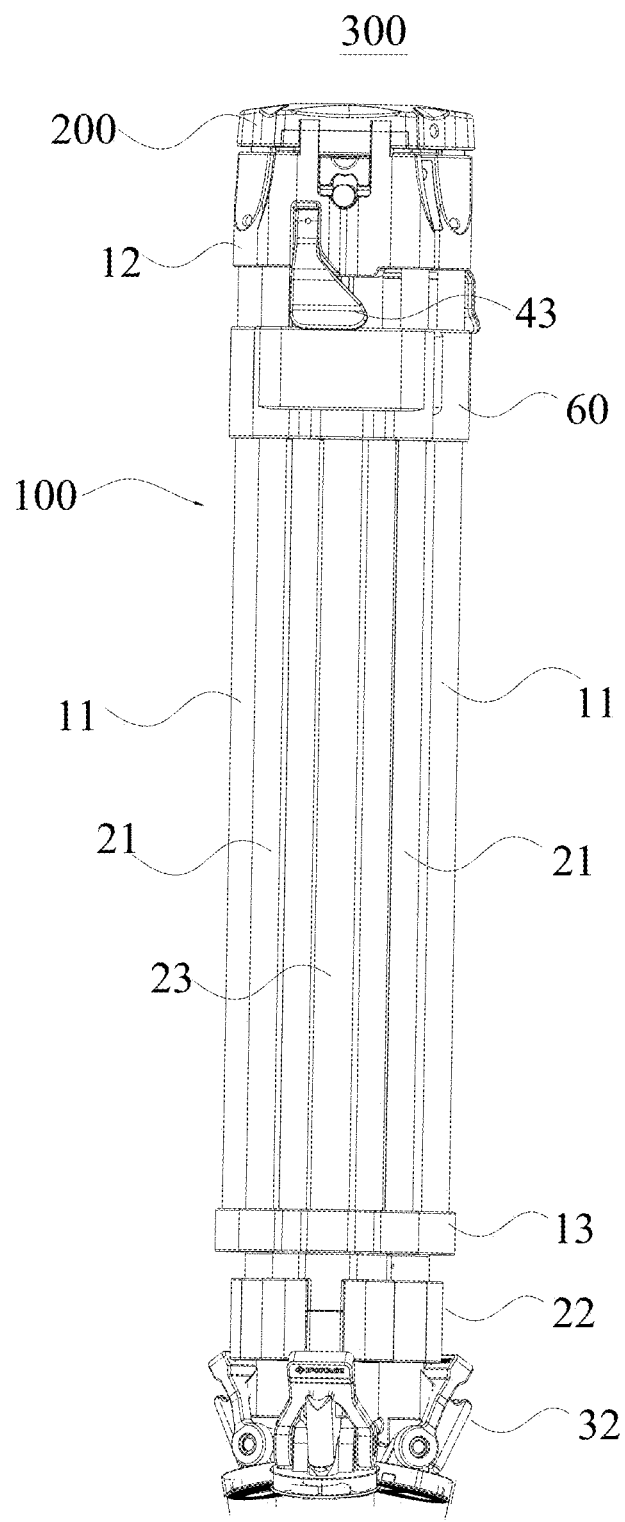
FIG. 2 shows a schematic structural view of the one-step locking stand of FIG. 1 in a folded state.
Figure 3:
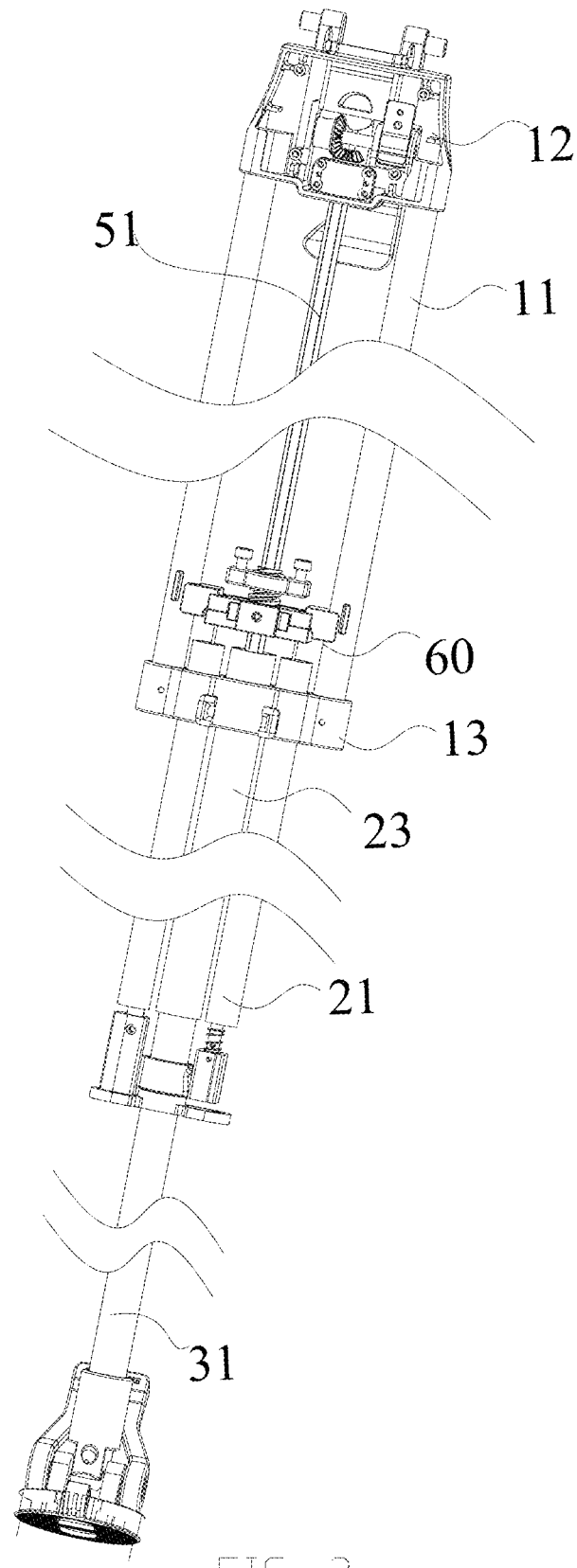
FIG. 3 shows a schematic structural view of a supporting leg of the one-step locking stand of FIG. 1.

REFERENCE SIGNS 300. stand; 100. supporting leg; 200. fixing portion; 10. first section; 11. first pipe; 12. first seat; 13. second seat; 131. forth hole; 132. sixth hole; 20. second section; 21. second pipe; 22. third seat; 221. fifth hole; 23. central shaft; 30. third section; 31. third pipe; 32. supporting base; 40. operating assembly; 41. supporter; 42. pivot pin; 421. first bevel gear; 43. handle; 50. first transmission assembly; 51. driving rod; 511. second bevel gear; 52. hollow screw; 521. center hole; 522. upper segment; 5221. external thread; 523. middle segment; 524. lower segment; 53. fixing nut; 60. first locking assembly; 61. sliding seat; 611. first hole; 612. second hole; 613. third hole; 62. adjusting member; 621. through hole; 622. upper slider; 6221. first abutting surface; 6222. receiving cavity; 6223. groove; 623. supporting slider; 6231. fixing hole; 6232. limiter; 6233. sliding rail; 624. perforation; 625. ejecting slider; 6251. fifth abutting surface; 6252. ejecting portion; 63. locking block; 631. second abutting surface; 632. curved surface; 64. screw; 70. second transmission assembly; 80. second locking assembly; 81. locking ring; 811. surrounding segment; 812. free segment; 8121. fourth abutting surface; 82. locking piece; 821. locking cavity; 8221. third abutting surface; 83. elastic piece; 84. cable adjuster; 841. adjusting knob.

DESCRIPTION OF EMBODIMENTS

The technical solutions of the embodiments of the present disclosure are described clearly and completely in detail below in combination with the accompanying drawings. Evidently, the embodiments described are merely a portion of the embodiments of the present disclosure, but not all of the embodiments. Based on the embodiments of the present disclosure, all other embodiments, which are obtained by those skilled in the art without creative work, fall within the protection scope of the present disclosure.

It should be noted that when a component is referred to as being "connected" to another component, it may be directly connected to another component, or there may also be a component arranged intermediately. When a component is considered to be "provided/arranged" on another component, it may be directly provided/arranged on another component or there may also be a component arranged intermediately.

Unless otherwise defined, all technical and scientific terms used herein have the same meaning as commonly understood by those skilled in the art of the present disclosure. The terms used herein in the specification of the present disclosure are only for illustration of specific embodiments, and are not intended to limit the present disclosure.

It is also to be noted that orientation terms such as left, right, top and bottom in the embodiments are only a relative concept to each other, or referred to by taking a normal use state of a product as reference, and should not be regarded as limitation.

Please refer to FIGS. 1 through 3 and 12, the present embodiment provides a stand 300, which includes a fixing portion 200 and at least one supporting leg 100 connected to the fixing portion 200. The fixing portion 200 is positioned above the supporting leg 100 and configured to support a camera or video equipment. In other embodiments, the fixing portion 200 may also be used to secure or support electronic devices or other objects to be supported. The supporting leg 100 can be extended or contracted to a desired length. In this embodiment, there are three supporting legs 100. In other embodiments, the number of the supporting legs 100 may also be one (that is, the stand is a monopod) or more. It should be noted that the fixing portion 200 may also be equipped with locking members, which can secure the supporting legs 100 at the desired angle when they are deployed.

The supporting leg 100 includes supporting sections, an operating assembly 40, a first transmission assembly 50, a first locking assembly 60, a second transmission assembly 70 and a second locking assembly 80. The supporting sections include a first section 10, a second section 20 and a third section 30 connected in axial order, and each section is movable axially relative to other sections, allowing for extension or shortening of the supporting leg 100. The axial direction is the longitudinal direction of the supporting leg 100.

The operating assembly 40 is arranged at one of the three sections and connected to the first transmission assembly 50. The first locking assembly 60 is fixedly arranged at the second section, slidably connected to the first section 10, and connected to the first transmission assembly. The first locking assembly 60 is configured to lock or release the first section 10 relative to the second section 20. The second transmission assembly 70 is connected to the first locking assembly 60 and slidable through a lumen of the second section 20, and the second transmission assembly 70 is spaced apart from the first transmission assembly 50. The second locking assembly 80 is arranged at the third section 30 and is connected to the second transmission assembly 70, for locking or releasing the third section 30 relative to the second section 20.

When it is required to adjust the length of the supporting leg 100, the operating assembly 40 is operated, which through the first drive assembly 50 drives the first locking assembly 60 to move axially to lock or release the first part 10 with respect to the second part 20. At the same time, the first locking assembly 60 exerts an axial force on the second transmission assembly 70, driving the second locking assembly 80 to move axially, locking or releasing the third section 30 with respect to the second section 20, to lock or release all the sections of the stand 200 in one step. The whole operation process is simple and convenient.

Specifically, referring again to FIGS. 1 through 3, the first section 10 of the supporting leg 100 is connected to the fixing portion 200. The first section 10 includes two first pipes 11 extending axially, a first seat 12, and a second seat 13. The first seat 12 is connected to the fixing portion 200. The first seat 12 is box-shaped with a body shell (not shown) and a bottom shell 121, which together define an accommodation cavity (not shown). The first section 10 and the first transmission assembly 50 respectively extend through the accommodation cavity. The two first pipes 11 are of the same length, parallel to each other, and arranged at lateral intervals. When the stand 300 of this embodiment is in use, the lateral direction, which is perpendicular to the axial direction, refers to the left-right direction. A top end of each first pipe 11 is fixedly connected to the first seat 12, and a bottom end of each first pipe 11 is fixedly connected to the second seat 13, such that the two first pipes 11 are fixed axially and laterally through the first and second seats 12, 13.

Figure 4:
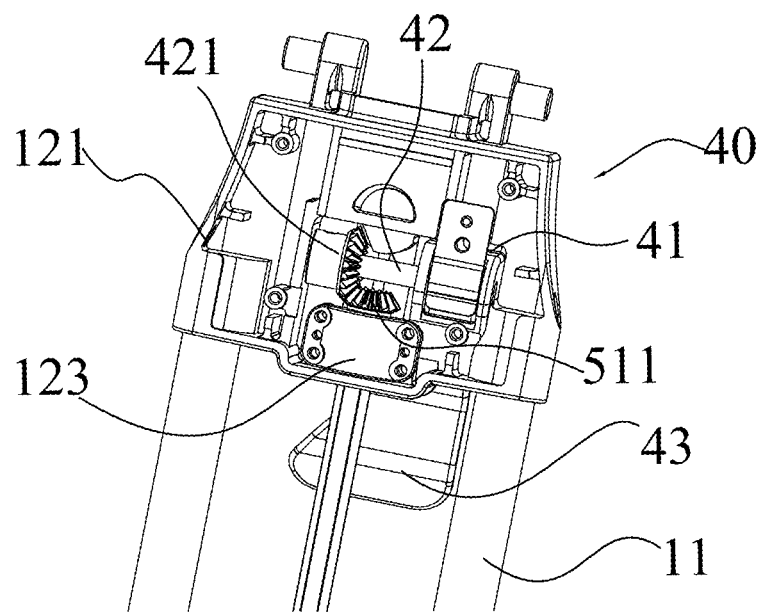
FIG. 4 shows a schematic view of the internal structure of the first seat of the supporting leg in FIG. 3.

The operating assembly 40 is configured to control the locking and releasing of the supporting leg 100. As shown in FIG. 4, the operating assembly 40 includes a supporter 41 disposed in the accommodation cavity of the first seat 12, a pivot pin 42 rotatably fixed to the supporter 41, and a handle 43 connected to the pivot pin 42. The supporter 41 protrudes from the bottom shell 121. The supporter 41 has two pin holes (not shown) that are laterally spaced and opposite each other, through which both ends of the pivot pin 42 respectively pass. Thus, the pivot pin 42 is hinged on the supporter 41 through the two pin holes. A first bevel gear 421 is provided at an outer periphery of the pivot pin 42. The bottom shell 121 further defines a window 1211, wherein one end of the handle 43 is connected to the pivot pin 42, and the other end extends from the window 1211.

The handle 43 is rotatable upwards and downwards. When the handle 43 is operated, the handle 43 drives the pivot pin 42 to rotate, together with the first bevel gear 421 on it to rotate forward or reverse. Preferably, a limiting member for limiting the first bevel gear 421 may be flexibly arranged on the first seat 12. When the limiting member is moved to contact the first bevel gear 421, the rotation of the pivot pin 42 and the handle 43 are limited. Due to the limiting member, it is possible to effectively prevent handle 43 from being accidentally touched.

In this embodiment, the operating assembly 40 is disposed on the first seat 12 of the first section 10. When the supporting leg 100 is deployed, the handle 43 of the operating assembly 40 is close to the user's hand, so that the user can operate the handle 43 without bending down, which is ergonomic, labor-saving and convenient. It can be understood that in other embodiments, the operating assembly 40 may also be disposed at other sections, such as in the second section 20.

Figure 5:
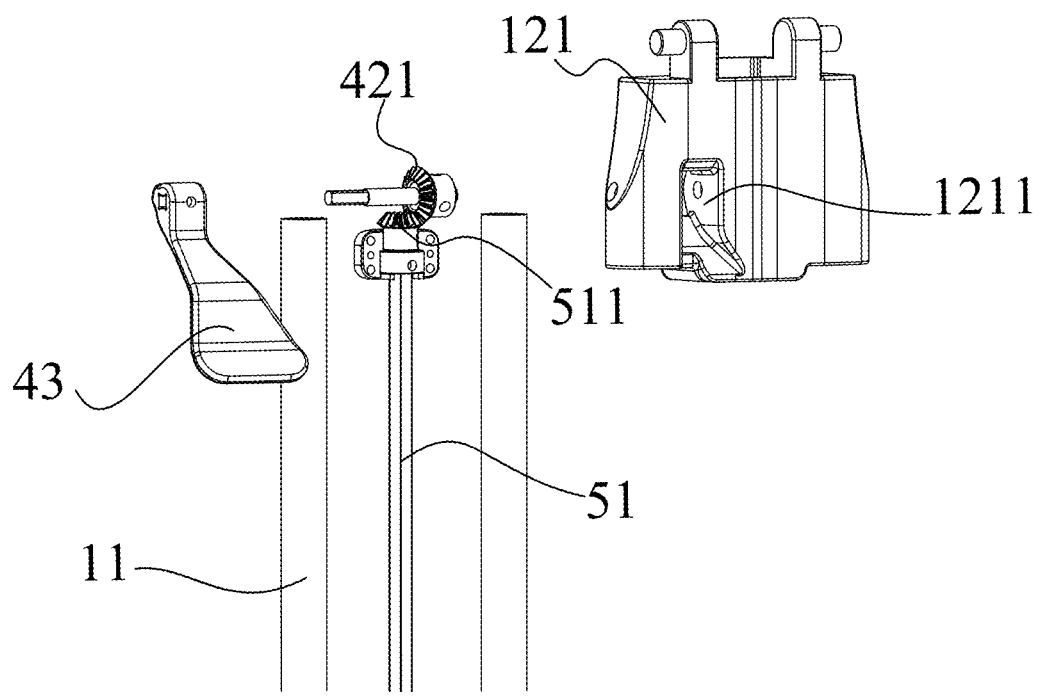
FIG. 5 shows a schematic exploded view of the first seat of the supporting leg in FIG. 3.

The first transmission assembly 50 is disposed at the first section 10 and between the two first pipes 11. The first transmission assembly 50 is connected to the operating assembly 40 and the first locking assembly 60 respectively for transferring the force of the operating assembly 40 to the first locking assembly 60. Please refer to FIGS. 4-6, the first transmission assembly 50 includes a driving rod 51 extending axially, a hollow screw 52 mounted around the driving rod 51, and a fixing nut 53 threadedly connected to the hollow screw 52. An axial upper end of the driving rod 51 passes through the first seat 12 and is connected with the pivot pin 42 of the operating assembly 40, with its axial lower end passing through the second seat 13.

The axial upper end of the driving rod 51 is provided with a second bevel gear 511 engaged with the first bevel gear 421, and the first bevel gear 421 and the second bevel gear 511 are arranged vertically to each other. When the operating handle 43 drives the pivot pin 42 to rotate, the first bevel gear 421 rotates and drives the second bevel gear 511 to rotate, thus converting the rotation of the pivot pin 42 into the rotation of the driving rod 51. Preferably, as shown in FIG. 4, a holding piece 123 may be provided on the bottom shell 121 of the first seat 12. The driving rod 51 is secured to the first seat 12 through the holding piece 123, thereby enhancing the stability of the driving rod 51. An outer periphery of the hollow screw 52 is provided with an external thread 5221 which is threadedly connected with a fixing nut 53. When the driving rod 51 rotates, the hollow screw 52 is driven to rotate. Since the hollow screw 52 is threaded to the fixing nut 53, under the action of the fixing nut 53, the hollow screw 52 is movable axially relative to the fixed nut 53.

Figure 7:
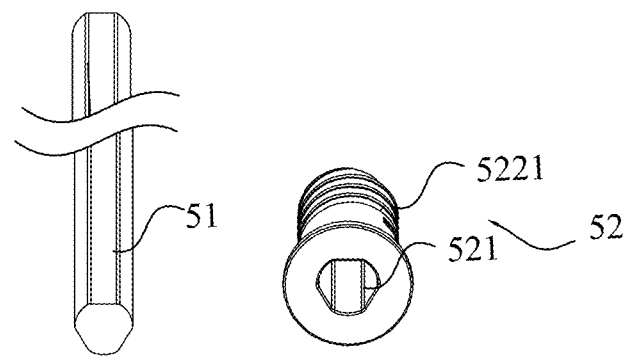
FIG. 7 shows a schematic structural view of a driving rod and hollow screw of the supporting leg in FIG. 6.

The hollow screw 52 and the driving rod 51 are connected in a form-fit manner. Specifically, as shown in FIG. 7, the driving rod 51 in this embodiment is a special-shaped column with a non-circular cross-section. A central hole 521 of the hollow screw 52 is also non-circular in cross-section and corresponds to that of the driving rod 51. For example, the driving rod 51 may be in the shape of a triangular prism, a polygonal prism, an elliptical column, a star-shaped column or others. Accordingly, the cross-section of the central hole 521 of the hollow screw 52 may be triangular, polygonal, elliptical, star-shaped, etc. As a result, when the driving rod 51 rotates, the hollow screw 52 rotates accordingly, and when the driving rod 51 does not rotate, the hollow screw 52 is movable axially along the driving rod 51. It can be understood that in other embodiments, the hollow screw 52 may also be rotatable with the driving rod 51 as well as movable in the axial direction relative to it, through a concave-convex fitting structure or other structures.

Figure 6:
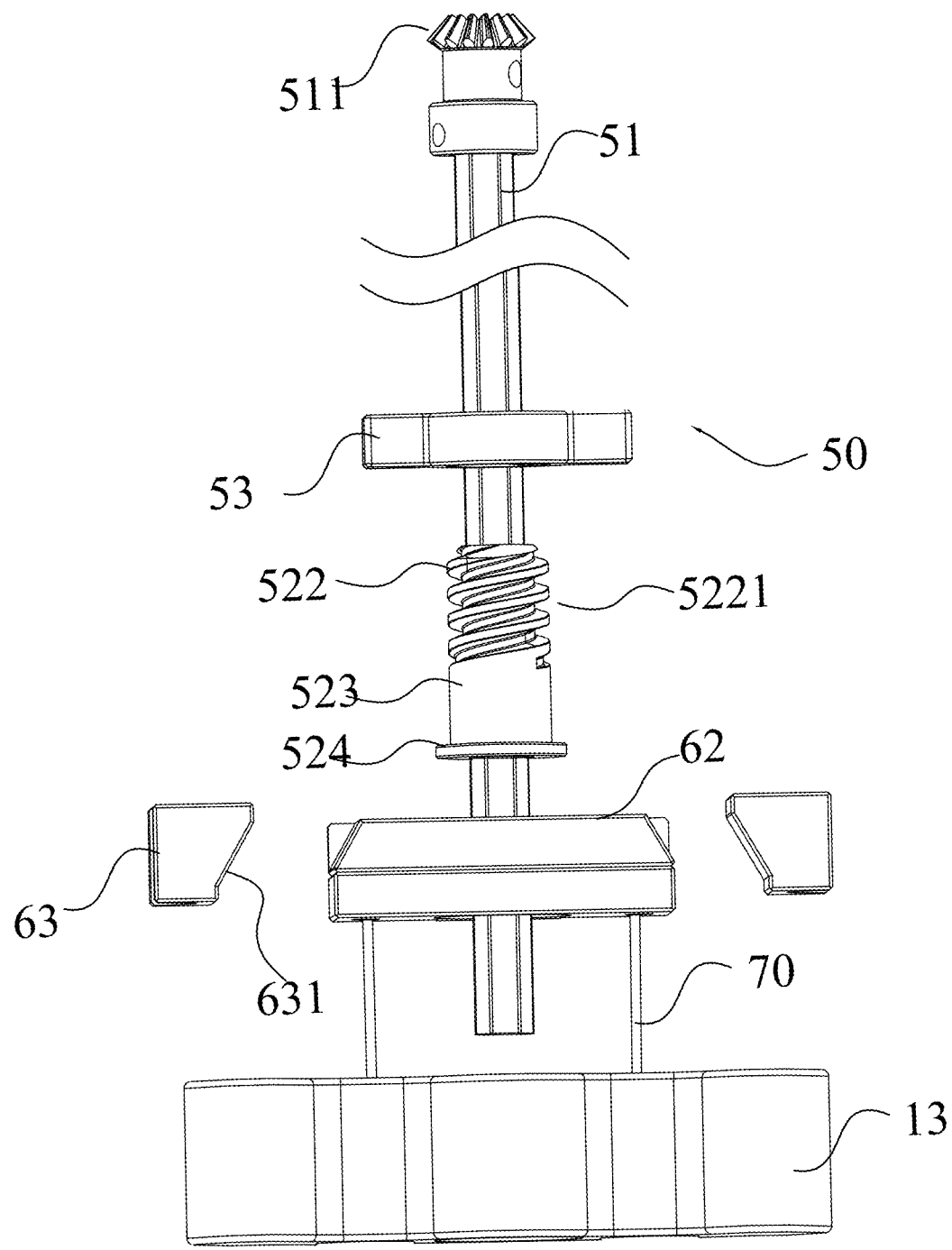
FIG. 6 shows a schematic structural view of a first transmission assembly and a first locking assembly of the supporting leg in FIG. 3.
Figure 8:
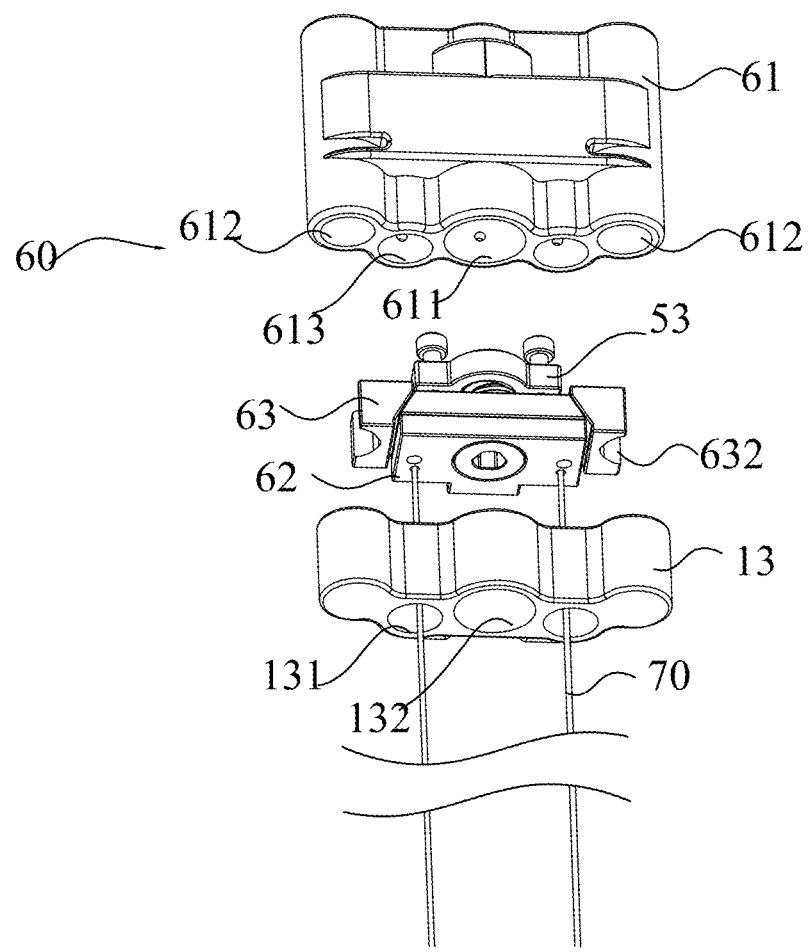
FIG. 8 shows a schematic structural view of the first locking assembly of the supporting leg in FIG. 3.
Figure 9:
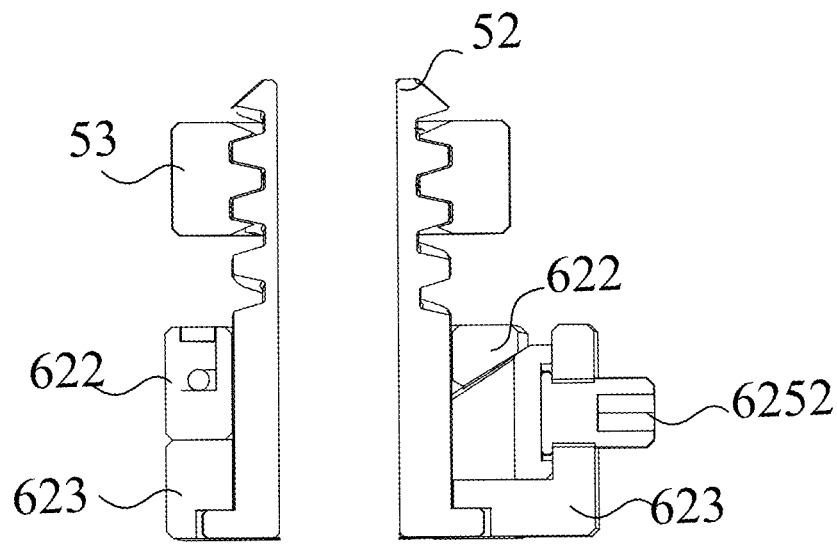
FIG. 9 shows a schematic cross-sectional structural view of the hollow screw, fixing nut and adjusting member of the supporting leg in FIG. 8.

Please refer to FIGS. 6 through 8. The hollow screw 52 is in an inverted T-shape and is divided into an upper segment 522, a middle segment 523, and a lower segment 524 connected in the axial order, which define the central hole 521 of the hollow screw 52 together. The external thread 5221 is arranged at the upper segment 522 of the hollow screw 52. The middle segment 523 is in a smooth cylindrical shape. The external diameter of the lower segment is greater than that of the middle segment 522. The fixing nut 53 has internal threads (not shown) that engage with the external threads 5221 of the upper segment 522. An axial length of the external threads 5221 of the hollow screw 52 is greater than an axial length of the fixing nut 53 so that the fixing nut 53 is movable along the external threads 5221 of the hollow screw 52. The fixing nut 53 is securely connected to the first locking assembly 60. When the driving rod 51 rotates, the hollow screw 52 is driven to rotate along the internal threads of the fixing nut 53, to move axially relative to the fixing nut 53.

In this embodiment, by means of the gear fit and thread fit between the operating assembly 40 and the first transmission assembly 50, the force exerted on the handle 43 is transferred to the first locking assembly 60 to drive it to move axially. Alternatively in other embodiments, the operating assembly 40 may be of other structure provided that axial displacement of the first locking assembly is allowed. For instance, the operating assembly could be a wrench directly connected to the driving rod for rotating it. Alternatively, the operating assembly could be integrated with the first transmission assembly as one single piece, for example as an axially movable actuator that applies an axial force directly to the first locking assembly 30.

The first locking assembly 60 is arranged at the first section 10 for locking or releasing it. As shown in FIGS. 6 and 8, the first locking assembly 60 includes a sliding seat 61, as well as an adjusting member 62 and a locking block 63 movably arranged in the sliding seat 61. The sliding seat 61 is in the shape of a box and defines a first hole 611 and a second hole 612 that are penetrated axially and arranged at lateral interval. The first hole 611 is located in a central portion of the sliding seat 61 and is used for the driving rod 51 to extend through. A number of the second holes 612 is two, which are respectively arranged on the left and right sides of the first hole 611, for a corresponding first pipe 11 to pass through, allowing the sliding seat 61 to slide through both the two first pipes 11 and the driving rod 51.

The hollow screw 52 and the fixing nut 53 of the first transmission assembly 50 are also located in the sliding seat 61. The sliding seat 61 is further provided with a screw 64, through which the fixing nut 53 is fixed to the sliding seat 61. The adjusting member 62 located below the fixing nut 53 defines a through hole 621 extending axially. The hollow screw 52 passes through the through hole 621 of the adjusting member 62 from bottom to top, with its upper segment 522 extending from the through hole 621 and being screwed to the fixing nut 53. The outer diameter of the lower segment 524 of the hollow screw 52 is larger than the diameter of the through hole 621, so the lower segment 524 can support the bottom of the sliding seat 61. When the driving rod 51 rotates, the hollow screw 52 moves axially, and the lower segment 524 of the hollow screw 52 drives the adjusting member 62 to move along with it.

Referring to FIG. 6 and FIG. 8, the left and right sides of the adjusting member 62 are provided with an inclined first abutting surface 6221, respectively. The two first abutting surfaces 6221 are close to each other in the upward direction and relatively far away from each other in the downward direction, rendering the adjusting member 62 to be substantially trapezoidal. There are also two locking blocks 63 respectively arranged between the adjusting member 62 and the corresponding first pipe 11. The left and right sides of each locking block 63 are respectively provided with a curved surface 632 and a second abutting surface 631. The curved surface 632 is configured to match with an outer wall of the corresponding first pipe 11, and the second abutting surface 631 is configured to match with the corresponding first abutting surface 6221 of the adjusting member 62. When the adjusting member 62 moves upward axially, the first abutting surface 6221 of the adjusting member 62 matches with the second abutting surface 631 to drive the locking block 63 to move laterally, so that the curved surface 632 of the locking block 63 moves close to the corresponding first pipe 11, abutting the first row of pipes 11 against the inner wall of the second hole 612 to achieve locking of the first row of pipes 11. At this point, the first pipes 11 are locked relative to the second section 20. When the adjusting member 62 moves downward axially, the first abutting surface 6221 of the adjusting member 62 is separated from the second abutting surface 631 of the locking block 63, and the curved surface 632 of the locking block 63 releases the abutment against the first pipe 11. At this point, the first locking assembly 60 and the second pipes 11 are movable axially relative to the first pipes 10, and the first and second sections can be adjusted to a desired length.

In this embodiment, it is configured such that when the handle 43 is rotated upward, the first transmission assembly 50 rotates to drive the adjusting member 62 to move axially upward, causing the locking block 63 to approach and abut against the corresponding first pipe 11. On the contrary, when the handle 43 is rotated downward, the locking block 63 moves away from the corresponding first pipe 11 to release the abutment against it.

The second section 20 is connected to the first section 10. The second section 20 includes a third seat 22, and two second pipes 21 extending axially. The two second pipes 21 are of the same length, parallel to each other and arranged at lateral interval. A top end of each second pipe 21 passes through the second seat 13 and is fixedly connected to the sliding seat 61, and a bottom end of each second pipe 21 is fixedly connected to the third seat 22 respectively, such that the two second pipes 21 are laterally fixed. Referring again to FIG. 8, the sliding seat 61 defines two third hole 613 penetrating axially, which are respectively arranged between the first hole 611 and the corresponding second hole 612, for holding the corresponding second pipe 21. The second seat 13 defines two fourth holes 131 penetrating axially and respectively aligned with the corresponding third hole 613. A top end of each second pipe 21 slides through the corresponding fourth hole 131, and is held in the corresponding third hole 613 of the sliding seat 61, such that when the sliding seat 61 is moved axially, the second pipes 21 are driven to move axially along the first section 10, so as to achieve movement of the first section 10 relative to the second section 20. In this embodiment, the first pipes 11 and the second pipes 21 are arranged at lateral intervals. In other embodiments, the first pipe 11 and the corresponding second pipe 21 may also be aligned with and in sleeved engagement with one another.

The second transmission assembly 70 is connected to the adjusting member 62 for transmitting the action of the adjusting member 62 to the third section 30. In this embodiment, each second pipe 21 is a hollow rod, and the second transmission assembly 70 can pass through the lumen of the second pipe 21. Specifically, the second transmission assembly 70 is a cable with a certain rigidity. The adjusting member 62 defines a perforation 624 for the cable to pass through. The cable is in an inverted U-shape, one end of which is connected to the third seat 22, and the other end passes through the lumen of the corresponding second pipe 21, the perforation 624 and perforation 624 of another second pipe 21 in sequence, and is finally connected to the third seat 22. The cable passes through the adjusting member and is partially received in the lumen of the second pipes, making the overall structure simple and high in transmission efficiency. In other embodiments, the second transmission assembly 70 may also be other structures that can transmit forces, such as wire ropes, steel bars, or connecting rods.

Figure 12:
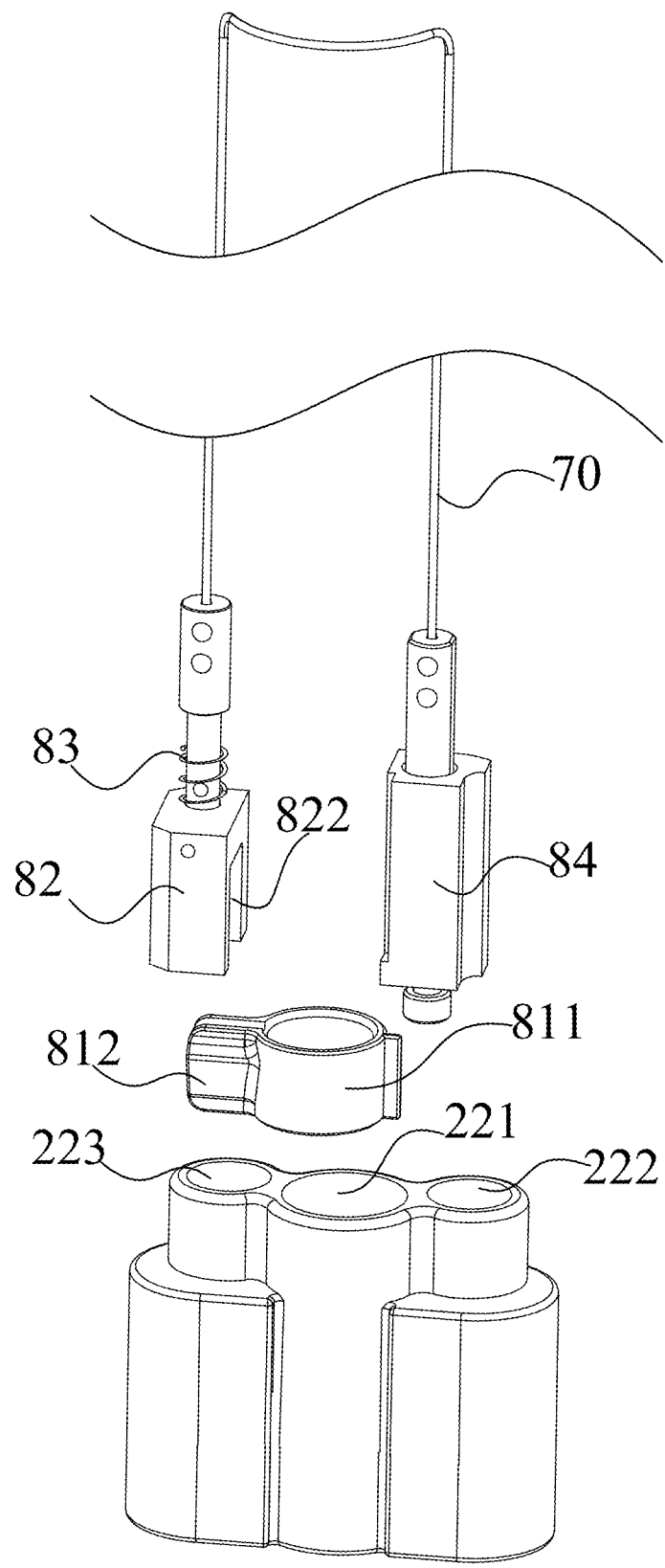
FIG. 12 shows a schematic structural view of a second transmission assembly and a second locking assembly of the supporting leg in FIG. 3.
Figure 13:
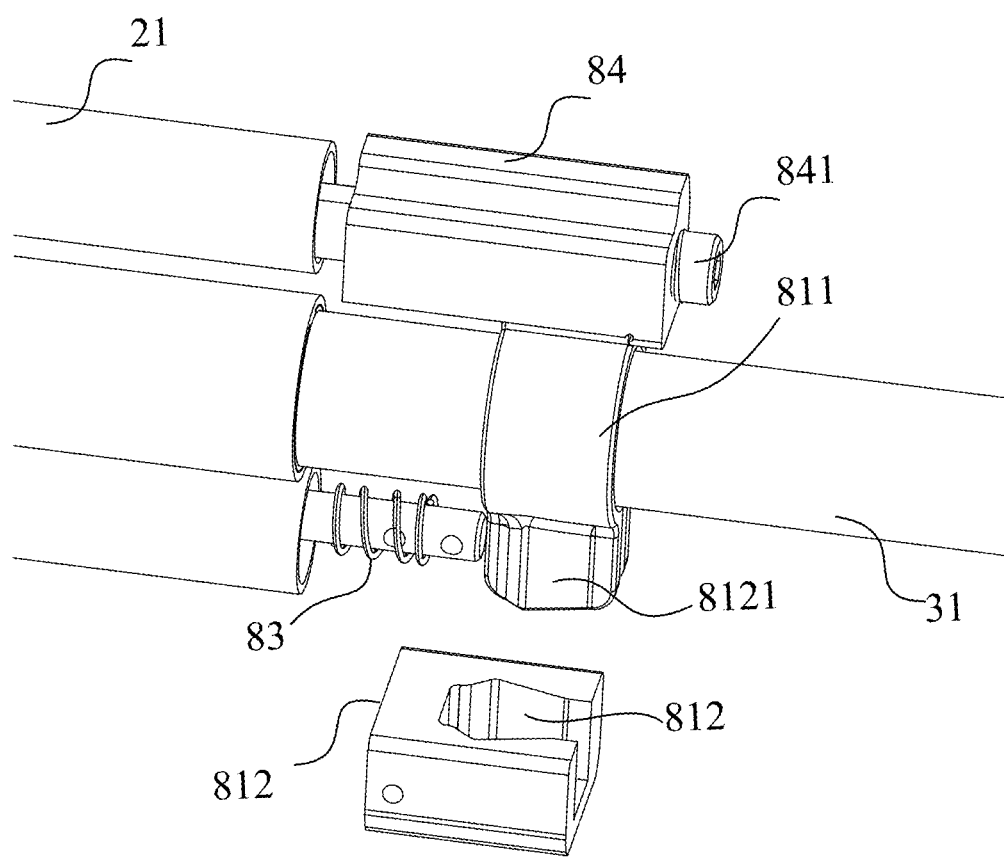
FIG. 13 shows a schematic structural view of a locking piece and locking ring of the supporting leg in FIG. 3.

The second locking assembly 80 is disposed in the third seat 22 for locking or releasing the third section 30. As shown in FIGS. 12 and 13, the second locking assembly 80 includes a locking ring 81 and a locking piece 82. In this embodiment, the locking piece 82 is in the shape of a block and is connected to one end of the cable. The locking piece 82 is coaxial with one of the second pipes 21 and defines a locking cavity 821 facing the other second pipe 21. An inner wall of the locking cavity 821 has two third abutting surfaces 8221 which are symmetrically arranged along the axial direction. The locking ring 81 is U-shaped and includes a curved surrounding segment 811 mounted around the third pipe, with two free segments 812 respectively connected to the surrounding segment 811 and approaching each other. The two free segments are located in the locking cavity 821. Each two free segments 812 of the locking ring 81 has a fourth abutting surface 8121 configured to match with the corresponding third abutting surface 8221. When the locking piece 82 is pulled by the cable to move upward axially, each third abutting surface 8221 of the locking piece 82 abuts against the corresponding fourth abutting surface 8121 of the locking ring 81, such that the two free segments approach each other, and the surrounding segment tightens to clamp the third section 30. When the tension on the cable is removed, the locking block 63 returns to its original position, thereby releasing the clamping of the third section 30.

Preferably, the locking piece 82 may further include an elastic piece 83. Axial ends of the elastic piece 83 are respectively connected to the locking piece 82 and one end of the cable. When the cable is axially pulled by the adjusting member 62, the cable pulls the locking piece 82 to move axially via the elastic piece 83, and the elastic piece 83 stretches. When the tension on the cable is removed, the elastic piece 83 will resume and drive the locking piece 82 to return to its original position. The elastic piece 83 in this embodiment is a spring.

The third section 30 includes a third pipe 31. In this embodiment, the third pipe 31 is a hollow rod with an inner diameter greater than the outer diameter of the driving rod 51. The third pipe 31 is slidably connected to the second section 20 through the third seat 22. As shown in FIG. 12, a central portion of the third seat 22 defines a fifth hole 221 for the third pipe 31 to slide through. The surrounding segment 811 of the locking ring 81 is received in the fifth hole 221 and mounted around the third pipe 31. When the locking ring 81 releases the clamping to the third pipe 31, the third pipe 31 is movable axially, thereby achieving movement of the third section 30 relative to the second section 20. When the third pipe 31 moves between the two second pipes 21, i.e. the second and third sections overlap each other, and then the sliding seat 61 of the first locking assembly 60 is moved axially upward, the first, second, and third sections 10, 20, 30 can overlap one another, thereby achieving contraction of the supporting leg 100. In addition, the driving rod 51 is movable to the lumen of the third pipe 31. Alternatively, a bottom end of the third section 30 is further provided with a supporting base 32 equipped with nails to enhance the friction with the ground.

Preferably, the second section 20 of the supporting leg 100 further includes a central shaft 23 arranged between the two second pipes 21. The central shaft 23 is a hollow rod extending in the axial direction. The second seat 12 defines a sixth hole 132 axially aligned with the first hole 611 of the sliding seat 61. An upper end of the central shaft 23 is held in the sixth hole 132, and its lower end is held in the fifth hole 221. When the second and third sections 20, 30 overlap each other, the third pipe 31 is movable axially to the lumen of the central shaft 23, effectively enhancing the motion stability of the third section 30.

Figure 10:
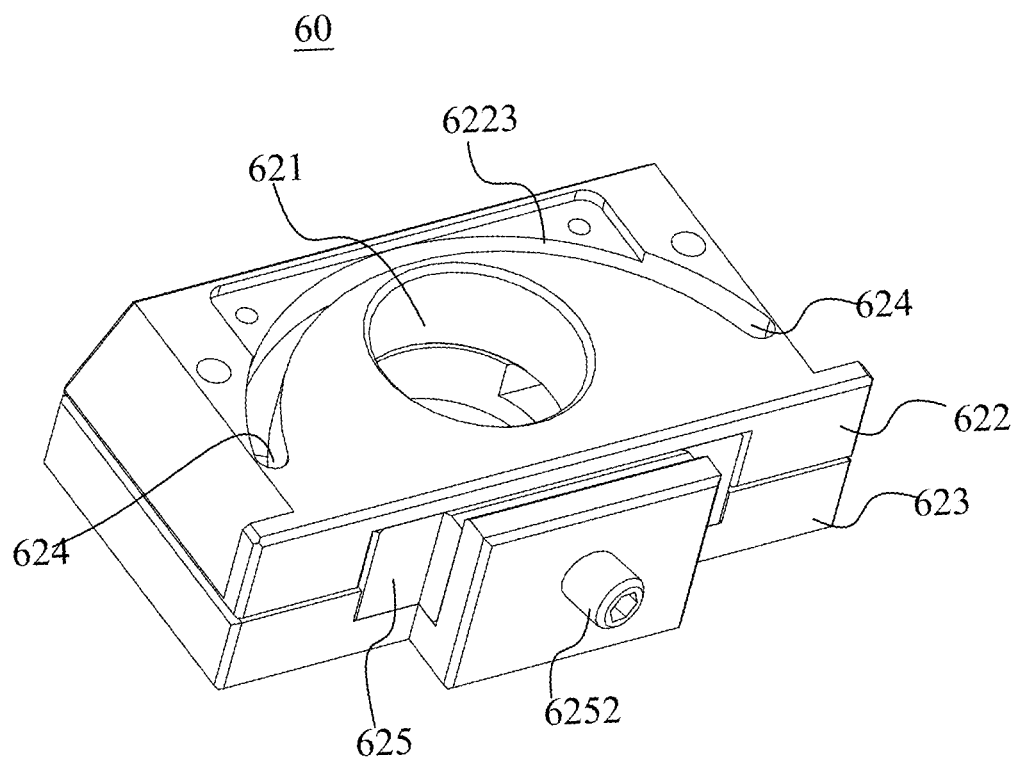
FIG. 10 shows a schematic structural view of the adjusting member in FIG. 8.
Figure 11:
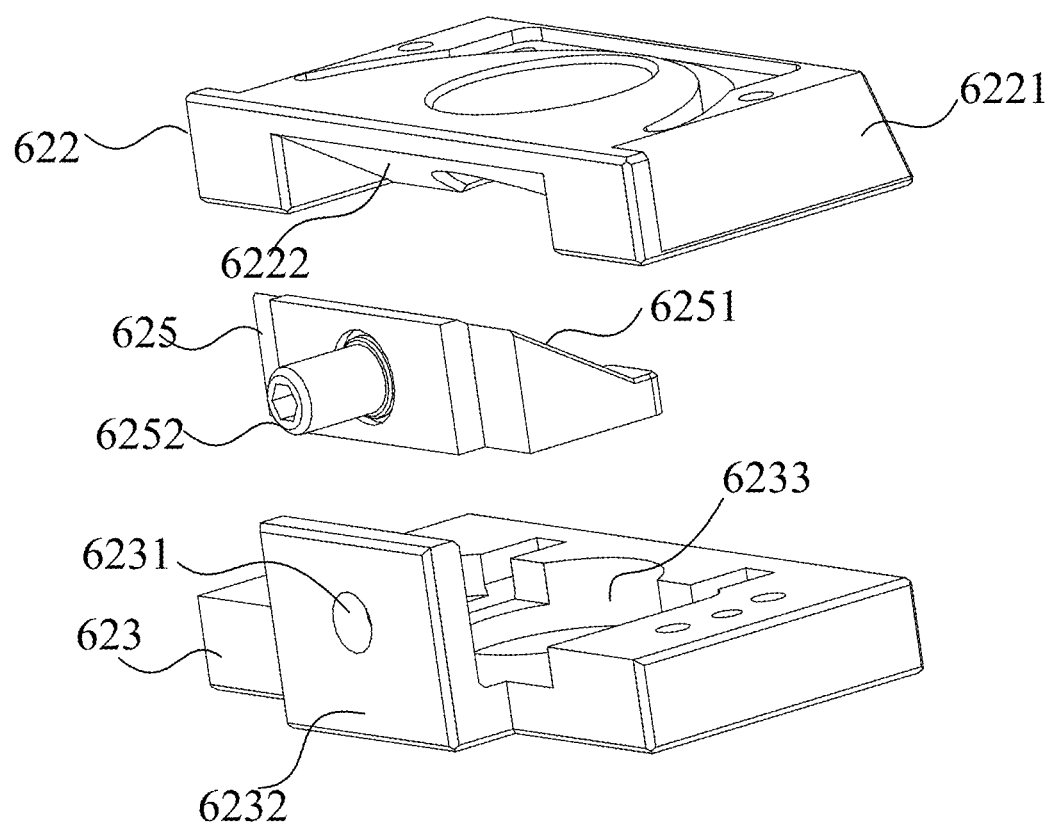
FIG. 11 shows a schematic exploded view of the adjusting member in FIG. 10.

In this embodiment, due to the coupling of the first and second locking assemblies 60, 80, one-step locking or releasing of the supporting leg 100 is achieved. However, since the first, second and third pipes 11, 21, 31 bear different pressures, the degree of wear of each pipe is not inconsistent, it may be difficult to lock or release the upper and lower pipes synchronously after long-term use. To ensure a better adjustment effect, the adjusting member 62 of this embodiment is configured as shown in FIGS. 10 and 11.

The adjusting member 62 includes an upper slider 622, an ejecting slider 625 and a supporting slider 623 arranged in axial order. The supporting slider 623 is block-shaped, and its bottom end is recessed with a sliding rail 6233 facing the supporting slider 623 for sliding the ejecting slider 625. The bottom end of the supporting slider 623 is provided with a limiter 6232, which is L-shaped and with its axial part defines a fixing hole 6231. The ejecting slider 625 has an ejecting portion 6252 that passes through the fixing hole 6231 and extends out of the sliding seat 61, to facilitate push-pull operations. The ejecting portion 6252 extends transversely, wherein the transverse direction is perpendicular to both the lateral direction and the axial direction. Preferably, the ejecting portion 6252 extends out a dorsal side of the sliding seat 61, that is, the side facing away from the user, to maintain a good look and facilitate the concealed operation of the stand 100. Preferably, the ejecting portion 6252 is an adjusting screw threadedly connected to the ejecting slider 625.

The ejecting slider 625 is located in the sliding rail 6233 of the supporting slider 623, which is substantially triangular and has an inclined fifth abutting surface 6251 that faces the upper slider 622. The upper slider 622 is in a block shape and defines a receiving cavity 6222 facing the ejecting slider 625 for receiving the upper slider 622. When the ejecting portion 6252 is pushed transversely, the ejecting slider 625 moves along the sliding rail 6233, with the fifth abutting surface 6251 abutting against the cavity wall of the receiving cavity 6222, to drive the upper slider 622 to move axially upward or downward. The upper slider 622 then acts on the two locking blocks 63 and the cable 70 respectively, achieving synchronous adjustment of all three sections.

The two first abutting surfaces are respectively arranged on the left and right sides of a top end of the ejecting slider 625. The upper slider 622, the supporting slider 623 and the ejecting slider 625 together define the perforation 624 and through hole 621. The number of perforations 624 is two, which are spaced apart. A top surface of the upper slider 622 defines a groove 6223 for holding the cable. The groove 6223 is arc-shaped, and the two perforation 624 are located at both ends of the groove 6223. The closed end of the U-shaped cable can be received in the groove 6223, with its two free ends respectively passing through the two perforations 624, then passing through the lumen of the corresponding second pipe 21, and finally connected to the third seat 22. In this embodiment, it is configured such that when the adjusting screw is rotated clockwise, the ejecting slider 625 pushes the upper slider 622 to move upward, thereby driving the two locking blocks 63 and the locking ring to lock the first pipes 10 and the third pipe 30 respectively. On the contrary, when the adjusting screw is turned counterclockwise, the locking blocks 63 release the abutment against the corresponding first pipe 11, and the locking ring 81 loosens the clamping to the third pipe 30.

Preferably, the locking piece 82 may also include a cable adjuster 84 for adjusting the tightness of the cable. As shown in FIG. 10, a seventh hole 222 and an eighth hole 223, which are respectively configured for accommodating the locking piece 82 and the cable adjuster 84, are respectively arranged on both sides of the fifth hole 221 of the third seat 22. The cable adjuster 84 is provided with an adjustment knob 841 protruding from the third seat 22, and the adjustment knob 841 is connected to one end of the cable. By rotating the adjustment knob 841, the tightness of the cable is adjustable. This allows independent adjustment of the third section 30, enhancing the adjustment accuracy of the second locking assembly 80.

The above are only preferred specific embodiments of the present disclosure. The protection scope of the present disclosure is not limited to the above-listed embodiments. Any person familiar with the technical field can obviously obtain the technology within the technical scope disclosed in the present disclosure. Simple changes or equivalent substitutions of the scheme fall within the protection scope of the present disclosure.

The invention claimed is:

1. A one-step locking stand, comprising: a fixing portion and at least one supporting leg connected to the fixing portion, wherein the supporting leg comprises:
first, second and third sections connected one another along an axial direction, each section being movable axially relative to other sections to extend or shorten the supporting leg;
an operating assembly arranged at one of the sections;
a first transmission assembly connected to the operating assembly;
a first locking assembly fixedly arranged at the second section, slidably connected to the first section, and connected to the first transmission assembly;
a second transmission assembly, slidable through a lumen of the second section, connected to the first locking assembly, as well as arranged spaced apart from the first transmission assembly; and
a second locking assembly arranged at the third section and connected to the second transmission assembly;
wherein when the operating assembly is operated, the first locking assembly is driven by the first transmission assembly to move axially, to lock or release the first section relative to the second section, and meanwhile, the second transmission assembly is driven by the first locking assembly to move axially, and the second locking assembly is driven by the second transmission assembly to lock or release the third section relative to the second section, so as to achieve one-step locking or releasing of all the sections of the supporting leg;
wherein the first transmission assembly comprises:
a driving rod connected to the operating assembly and extending axially;
a hollow screw mounted around one end of the driving rod away from the operating assembly and connected to the first locking assembly; and
a fixing nut threadedly connected to an outer periphery of the hollow screw,
wherein the operating assembly is configured to drive the driving rod to rotate axially, and when the driving rod rotates, the hollow screw moves axially under joint action of the driving rod and the fixing nut, driving the first locking assembly to move axially; and
wherein the first locking assembly comprises a sliding seat respectively mounted around the first and second sections, as well as an adjusting member and a locking block movably arranged within the sliding seat; wherein the adjusting member is connected to the second transmission assembly and defines a through hole penetrating axially, a top end of the hollow screw passes through the through hole from bottom to top and is then connected to the fixing nut, the fixing nut is fixedly arranged within the sliding seat, a bottom end of the hollow screw supports a bottom end of the adjusting member, and the locking block is arranged between the adjusting member and the first section; wherein when the hollow screw moves axially, the adjusting member moves axially together therewith, thereby driving the locking block to move towards or away from the first section, and the adjusting member drives the second transmission assembly to move axially at the same time.

2. The stand according to claim 1, wherein the operating assembly is arranged at an end of the first section away from the second section.

3. The stand according to claim 1, wherein the hollow screw and the driving rod are connected in a form-fit manner, wherein when the driving rod rotates, the hollow screw rotates together therewith.

4. The stand according to claim 1, wherein the adjusting member comprises an upper slider, an ejecting slider and a supporting slider deposed in axial order, the upper slider is configured to drive the locking block to move towards or away from the first section, the ejecting slider has an ejecting portion protruding out from the sliding seat, and the supporting slider is connected to the sliding seat through the ejecting portion, and wherein when the ejecting portion is operated, the ejecting slider drives the upper slider to move axially.

5. The stand according to claim 1, wherein the first section comprises two first pipes respectively spaced apart on both sides of the driving rod, the second section comprises two second pipes respectively spaced apart on both sides of the driving rod, each second pipe is movable axially between the driving rod and a corresponding first pipe, and the third section comprises a third pipe movable to mount around the driving rod.

6. The stand according to claim 5, wherein the second section further comprises a hollow central shaft extending axially, and the third pipe is movable to be inserted into a lumen of the central shaft.

7. The stand according to claim 5, wherein the adjusting member defines one or more perforations running axially therethrough, the second transmission assembly successively passes through a lumen of one second pipe, the one or more perforations, and a lumen of another second pipe, and then connects to the second locking assembly.

8. The stand according to claim 1, wherein the second transmission assembly is a cable.

9. The stand according to claim 5, wherein the second locking assembly comprises a locking ring and a locking piece, the locking piece defines a locking cavity and is connected to one end of the second transmission assembly, wherein the locking ring comprises a surrounding segment mounted around the third pipe and two free segments respectively connected to both ends of the surrounding segment and received within the locking cavity, and wherein when the second transmission assembly moves axially, the locking piece is driven to move axially together therewith, and the locking cavity matches with the two free segments to bring them to move towards or away from each other, such that the surrounding segment locks or releases the third pipe.

10. The stand according to claim 4, wherein one side of the supporting slider is provided with a limiter which defines a fixing hole, and the ejecting portion passes through the fixing hole and extends outside the sliding seat.

11. The stand according to claim 4, wherein the ejecting portion is an adjusting screw threaded to the ejecting slider.

12. The stand according to claim 4, wherein an extension direction of the ejecting portion is substantially perpendicular to the axial direction.

13. The stand according to claim 7, wherein a number of the perforations is two, and the adjusting member is recessed with a groove for holding the second transmission assembly, with the two perforations respectively located at each end of the groove.

14. The stand according to claim 1, wherein the at least one supporting leg comprises three supporting legs.

15. The stand according to claim 1, wherein the operating assembly comprises
a supporter,
a pivot pin rotatably arranged on the supporter and in torque transmission connection with the driving rod, and
a handle connected to the pivot pin,
wherein when the handle is operated, the pivot pin is brought to rotate by the handle, and the driving rod is driven to rotate about a central axis thereof by the pivot pin.

16. The stand according to claim 15, wherein a first bevel gear is provided on an outer periphery of the pivot pin, a second bevel gear, which engages with the first bevel gear, is provided on an upper end of the driving rod, and the first bevel gear is arranged perpendicular to the second bevel gear.

17. The stand according to claim 1, wherein an outer periphery of the hollow screw is provided with an external thread threaded to the fixing nut.

18. The stand according to claim 17, wherein an axial length of the external thread of the hollow screw is greater than an axial length of the fixing nut.

* * * * *